United States Patent [19]

Stoffel et al.

[11] Patent Number: 5,801,738

[45] Date of Patent: Sep. 1, 1998

[54] PROCESS FOR ALLEVIATING BLEED AND IMPROVING COLOR IN PRINTED ELEMENTS

[75] Inventors: John Lawrence Stoffel, San Diego, Calif.; Arthur Charles Shor, Concordville, Pa.; Harry Joseph Spinelli, Wilmington, Del.; Sheau-Hwa Ma, Chadds Ford, Pa.; Howard Matrick, Highlands, N.J.; Mark Leland Choy, Escondido, Calif.; Loren Eugene Johnson, Corvallis, Oreg.

[73] Assignee: E. I. du Pont de Nemours and Company, Wilmington, Del.

[21] Appl. No.: 601,900

[22] Filed: Feb. 15, 1996

Related U.S. Application Data

[63] Continuation of Ser. No. 223,787, Apr. 6, 1994, Pat. No. 5,555,008, which is a continuation-in-part of Ser. No. 85,782, Jul. 6, 1993, abandoned.

[51] Int. Cl.$^6$ .................... B41J 2/21; C09D 11/02
[52] U.S. Cl. ................ 347/100; 347/96; 524/521; 524/522
[58] Field of Search .................. 347/96, 100; 524/521, 524/522

[56] References Cited

U.S. PATENT DOCUMENTS

| | | | |
|---|---|---|---|
| 5,198,023 | 3/1993 | Stoffel | 106/22 R |
| 5,271,765 | 12/1993 | Ma | 106/22 D |

*Primary Examiner*—Valerie Lund

[57] ABSTRACT

A process for alleviating bleed and improving color in printed elements comprises applying an anionic printing liquid and a cationic printing liquid to a substrate adjacent to one another, wherein at least one of the printing liquids contains a polymer and reacting the anionic and cationic printing liquids with one another; wherein the color integrity of the anionic and cationic printing liquids is maintained.

18 Claims, No Drawings

PROCESS FOR ALLEVIATING BLEED AND IMPROVING COLOR IN PRINTED ELEMENTS

This is a continuation of application Ser. No. 08/223,787, now U.S. Pat. No. 5,555,008 filed Apr. 6, 1994 which, in turn, is a continuation-in-part of application Ser. No. 08/085,782, filed Jul. 6, 1993, now abandoned.

FIELD OF THE INVENTION

This invention relates to a method of making printed elements. More particularly, this invention relates to a method of making printed elements having reduced color bleed and improved color.

BACKGROUND OF THE INVENTION

There are many methods of making printed elements in which printing liquids are applied to a substrate to form an image. The term "printing liquid," as it is commonly understood in the art, means a colorant in a liquid media, as distinguished from solid and dry colorants, and includes paints toners, inks, etc. The liquid media may be an organic solvent ("solvent based") or water ("aqueous based"). The colorant may be a dye or a pigment. Other ingredients typically are present in the printing liquid, depending upon the particular printing technique being employed.

Exemplary methods of using printing liquids include gravure and press printing, xerographic techniques using liquid toners, and ink jet printing, to name but a few of these methods, ink jet printing has become increasingly popular, particularly for so-called "desk-top publishing" applications, because of its ability to make multi-color prints by introducing three or four primary inks on a substrate in a single pass. Other printing methods generally require at least one pass through the printer for each primary color.

Despite the breadth of techniques available for making printed elements, a common problem can arise when a multi-colored element is desired in which a printing liquid of one color is placed in abutting relationship to a printing liquid of another color. This problem is manifested in a mixing or "bleeding" of the two printing liquids at their interface, whereby the line of demarcation between the two printing liquids is obscured. Bleeding may cause undesired color formation at the interface and a concurrent loss of resolution, color separation, edge acuity and color purity in the image. The more contrasting the two adjacent liquids are in color (such as black and yellow), the more visual the bleed. Bleed is also particularly noticeable when the mixing of two inks produces a secondary color, such as when blue and yellow mix to produce green.

Bleed is a particular problem in ink jet printing because the relatively low viscosity inks used therein tend to spread and because ink jet printers have the capability of printing three or four primary colors in simultaneous (or near simultaneous) fashion.

Several methods have been proposed to prevent bleed of adjacent printing liquids. The most obvious method is to apply the two printing liquids at a distance from one another such that no intermingling or mixing of the printing liquids can occur. This method is not a solution to the problem, however, and produces images having poor resolution.

Another method, and the one most commonly used, involves delay in applying the second printing liquid until the first printing liquid is completely dry. This method is also disadvantageous, not only because of its inefficiencies, but also because it is not particularly effective. For example, it has been observed that bleed may occur even if the first printing liquid is dry, which is believed to be caused by the colorants of the first printing liquid becoming "redissolved" in the liquid medium of the second printing liquid. Thus, the more soluble the components of the first printing liquid in the liquid medium, the more likely bleed will occur even if the first printing liquid is dry. This method is particularly disadvantageous in ink jet printing applications because it places an arbitrary limitation on the efficiency of generating multi-colored prints.

U.S. Pat. No. 5,091,005 teaches that the addition of formamide to the inks will reduce the occurrence of bleed in some circumstances. Yet another approach to control bleed is to increase the rate of penetration of the printing liquid into the substrate, which has its own shortcomings. First, it is inherently limited to those printing applications using particular printing liquid/substrate combinations. For example, highly absorbant substrates may be required to control bleed. Second, bleed will still be apparent unless the first printing liquid becomes bound to the substrate such that it will not be dissolved by the liquid medium of the second printing liquid. Third, known ways of increasing penetration have disadvantages in that they have a tendency to degrade text quality.

A combination of the above approaches is disclosed in U.S. Pat. No. 5,116,409, which discloses use of zwitterionic surfactants or non-ionic amphiphiles in concentrations above their respective "critical micelle concentration." The formation of micelles containing dye molecules is said to prevent the dye molecules in each ink from mixing.

U.S. Pat. No. 5,181,045 teaches a method of ink jet printing wherein one of inks contains a dye that becomes insoluble under defined pH conditions and the other ink has a pH that renders the dye contained in the first ink insoluble. This method is inherently limited, however, to a specific group of dyes as colorants. In addition, the ink formulations are also constrained by the need for pH buffers, for example, which further limits the utility of that method.

Dyes are a common colorant used in ink jet printing due to their solubility in water. In addition, dyes provide vibrant chromatic colors on plain paper. Unfortunately, however, many dyes possess poor resistance to light, water and handling on paper. Consequently, dye colorants have deficiencies for archiving print samples.

Pigment colorants have been used as an alternative for dyes since they generally possess excellent light and water fastness. However, most pigments do not achieve the same color intensity (i.e., "chroma") on plain paper as dyes.

One approach to improve pigment chroma is to employ a vehicle that holds the colorant on the paper surface rather than allowing the pigment to diffuse into the paper. Such vehicles tend not to penetrate into the paper, however, and are not adapted for quick drying or bleed control.

Another approach to improving pigment chroma is to use a specially coated media which helps keep the colorant on the surface of the paper. However, such media typically is more expensive than paper. Furthermore, one is restricted to printing only with the special media.

Accordingly, there is a need for an improved method for printing multi-colored images that does not present the bleed problem discussed above. Moreover, there is a particular need for such an improved method that achieves the favorable color chroma that may be obtained with dye colorants on plain paper, while providing the excellent resistance to water and light obtainable with pigment colorants.

SUMMARY OF THE INVENTION

It now has been found that bleed between two adjacent inks on a printing medium may be reduced by selecting an anionic and a cationic ink, and including in one of the inks a polymer having the same ionic character as that ink. Accordingly, in one embodiment the present invention provides a process for creating a multicolor printed element having reduced color bleed comprising:

(a) providing at least one anionic ink and at least one cationic ink, both of the inks comprising an aqueous medium and a colorant, at least one of the inks containing approximately 0.1 to 30% by weight of a polymer having the same ionic character as said ink; and (b) applying the anionic and cationic inks in contact with each other on the element.

In another embodiment, the present invention provides an inkset adapted for use together to minimize bleed, the inkset comprising:

(a) at least one anionic ink comprising an aqueous medium and a colorant, and (b) at least one cationic ink comprising an aqueous medium and a colorant, wherein at least one of the inks contains approximately 0.1 to 30% a by weight of a polymer having the same ionic character as the ink.

While the invention may be used in a variety of applications, it is particularly well adapted for use in ink jet printing, more specifically in thermal ink jet printing applications. In four color applications, particularly advantageous results may be achieved by selecting anionic inks for black and cyan colors, and cationic inks for yellow and magenta colors. While the inks typically will be applied in abutting relationship on the medium, the inks also may be applied in an overlay relationship.

DETAILED DESCRIPTION OF THE INVENTION

The present invention will now be described in detail with particular reference to aqueous ink jet ink compositions. The present invention, however, has application with other printing liquids and in other printing techniques.

Aqueous cationic and anionic inks suitable for use in this invention have an aqueous carrier medium and contain a colorant, which may be a pigment or a dye, or combinations thereof. Either or both of the cationic or anionic inks may contain a pigment or a dye (or combination) as the colorant, provided that the charge characteristics are compatible with the rest of the ink components. All combinations of pigmented or dye-based cationic and anionic aqueous ink jet inks are considered suitable. It has been found that the advantages of reduced bleed characteristics in the printed element are observed in all such combinations, wherein the inks are in abutting relationship to one another, so long as at least one of the ink jet inks contains the requisite polymer. It has also been found that the advantages of improved color in the printed element are observed in all such combinations, wherein the inks are in overlay relationship to one another, so long as at least one of the ink jet inks contains the requisite polymer. The resulting printed images are of high quality in that individual dots are round with sharp edges, and there is little feathering or strike through.

At least one of the inks contains a polymer having the same ionic character as the ink composition to which it is added (i.e., a cationic or anionic polymer, as the case may be). When referring to the "ionic character" of the ink compositions, it is well known in the art that the ink compositions themselves are not charged; they are neutral. Thus, the term "ionic character" refers to the charge carried by the major functional components of the ink composition in their ionic form. Such components typically are neutralized with a counterion so as to render the ink neutral. It is commonly understood in the art that cationic inks contain cationic components and anionic inks contain anionic components.

SUBSTRATES

Substrates that may be selected in practicing this invention include all of those commonly used in generating printed elements. For ink jet ink applications, cellulose and non-cellulose type substrates may be used to advantage, with the cellulose type substrates, such as paper, being preferred. If sized, the degree of sizing for the substrate can be from 1 second to 1000 seconds as measured by the Hercules size test (HST), as described in TAPPI standards T530 PM-83. The substrate is chosen so its HST value is compatible with the volume and composition of the ink drop in the printer to be used. The preferred HST is in the range of 200 to 500 seconds, most preferably 350 to 400 seconds. Some useful papers include 100% bleached kraft composed of a blend of hard and soft wood, 100% wood free cotton vellum, and wood containing paper made translucent either by pulp beating or with additives. A preferred paper is Gilbert Bond paper (25% cotton) designated style 1057, manufactured by Mead Company, Dayton, Ohio. Other substrates include cardboard, transparent films such as polyethylene terephthalate, fabrics, etc.

INK COMPOSITION

As mentioned above, aqueous ink jet inks suitable for use in the present invention may be cationic or anionic. In either case, the inks comprise an aqueous carrier medium and a colorant, which may be either a pigment, a dye, or combinations thereof, with at least one of the inks further containing a polymer. The inks may also contain other additives as mentioned below or known in the art of ink jet printing.

AQUEOUS CARRIER MEDIUM

The aqueous carrier medium is water or a mixture of water and at least one water soluble organic solvent. Selection of a suitable mixture depends on requirements of the specific application, such as desired surface tension and viscosity, the selected colorant, drying time of the ink, and the type of substrate onto which the ink will be printed. Representative water-soluble organic solvents that may be selected are disclosed in U.S. Pat. No. 5,085,698. A mixture of water and a polyhydric alcohol, such as diethylene glycol, is preferred as the aqueous carrier medium.

In the case of a mixture of water and a water-soluble solvent, the aqueous carrier medium usually contains from about 30% to about 95% water with the balance (i.e., 70 to 5%) being the water-soluble solvent. The preferred compositions are approximately 60% to about 95% water, based on the total weight of the aqueous carrier medium.

The amount of aqueous carrier medium in the ink is in the range of approximately 70 to 99.8%, preferably approximately 94 to 99.8%, based on total weight of the ink when an organic pigment is selected; approximately 25 to 99.8%, preferably approximately 70 to 99.8% when an inorganic pigment is selected; and 80 to 99.8% when a dye is selected.

COLORANTS

Colorants useful in practicing this invention include both pigments and dyes.

Pigments

A wide variety of organic and inorganic pigments, alone or in combination, may be selected to make the ink. The term "pigment" as used herein means a water insoluble colorant. The pigment particles are sufficiently small to permit free flow of the ink through the ink jet printing device, especially at the ejecting nozzles that usually have a diameter ranging from 10 microns to 50 microns. The range of useful particle size is approximately 0.005 micron to 15 microns. Preferably, the pigment particle size should range from 0.005 to 5 microns, next preferably from 0.005 to 1 micron and, most preferably, from 0.005 to 0.3 micron.

The selected pigment may be used in dry or wet form. Representative commercial dry pigments and water wet presscakes that may be selected to advantage are disclosed in U.S. Pat. No. 5,085,698.

Fine particles of metal or metal oxides also may be used to practice the invention, and may be selected for appropriate applications.

When a pigment is chosen as the colorant for the ink, it is conventional to disperse the pigment, preferably with a polymeric dispersant, although surfactants may also be used as dispersants. Such polymer dispersants are discussed hereinbelow.

In the case of organic pigments, the ink may contain up to approximately 30% pigment by weight, but will generally be in the range of approximately 0.1 to 15%, preferably approximately 0.1 to 8%, by weight of the total ink composition for most thermal ink jet printing applications. If an inorganic pigment is selected, the ink will tend to contain higher weight percentages of pigment than with comparable inks employing organic pigment and may be as high as approximately 75% in some cases, because inorganic pigments generally have higher specific gravities than organic pigments.

Dyes

Cationic or anionic dyes may be selected for use in the present invention. The cationic dyes yield colored cations in aqueous solution. Types of cationic dyes that may be selected include the basic dyes, and some of the mordant dyes that are designed to bind acidic sites on substrates such as fibers. Cationic dyes that may be used to advantage include azo compounds, diphenylmethane compounds, triarylmethane compounds, xanthene compounds, acridine compounds, quinoline compounds, methine compounds, polymethine compounds, thiazoles, indamines, indophenols, azine compounds, oxazine compounds and thiazine compounds. The selected cationic dye needs to have sufficient solubility in the aqueous carrier medium to produce the desired color intensity and avoid poor print head performance.

Anionic dyes yield colored anions in aqueous solution. Types of anionic dyes commonly used in aqueous ink jet inks are the Acid, Direct, Food, Mordant, and Reactive dyes. Representative anionic dyes that may be used to advantage include nitroso compounds, nitro compounds, azo compounds, stilbene compounds, triarylmethane compounds, xanthene compounds, quinoline compounds, thiazole compounds, azine compounds, oxazine compounds, thiazine compounds, aminoketone compounds, anthraquinone compounds, indigo compounds and phthalocyanine compounds.

POLYMERS

At least one of any two adjacent inks applied to the substrate must contain a polymer in order to obtain the benefits of this invention. The polymer may be present in the form of a dispersant for pigmented inks or may be added to the ink independent of the colorant. As already noted, the polymer is of the same ionic character as the ink, i.e., cationic polymers for cationic inks and anionic polymers for anionic inks.

Although not bound by any particular theory, Applicants believe that the polymer flocculates/precipitates at the interface of the two adjacent inks (because of the incompatibility of anionic polymers in cationic inks and the converse) to form a physical barrier which prevents the inks from intermingling and thus controls bleed.

Polymers suitable for use in this invention may be homopolymers, copolymers, block polymers (such as AB, BAB or ABC block polymers), or branched or graft polymer. Methods of preparing such polymers are numerous and well known to those skilled in the art. The block polymers are advantageously produced by stepwise polymerization process such as anionic or group transfer polymerization as described in Webster, U.S. Pat. No. 4,508,880. Polymers so produced have precisely controlled molecular weight, block sizes and very narrow molecular weight distributions. The polymer typically has a dispersity less than 2, generally in the range of 1.0 to 1.4. Dispersity is the polymer weight average molecular weight divided by its number average molecular weight.

The amount of polymer and choice of counter ion depends on the desired structure, molecular weight and other properties of the polymer, and upon the other components of the ink composition. Useful polymers have a number average molecular weight of below 20,000, preferably below 10,000, and typically in the range of 1,000 to 6,000. Preferred block polymers have number average molecular weights in the range of 500 to 3000 for each block.

Generally, the polymer in dye-based inks is present in the range of approximately 0.05% to 25%, by weight, based on the weight of the total ink composition, preferably in the range of approximately 0.1% to 10%. If the polymer (either anionic or cationic) is used as a dispersant for the pigment, it may be present in the range of 0.1 to about 30%, preferably 0.1 to about 8%, by weight, based on the total weight of the ink composition. If the amount of polymer becomes too high, the ink color density will be unacceptable and it will become difficult to maintain desired ink viscosity. Dispersion stability of the pigment particles is adversely affected if insufficient polymer is present.

Cationic Polymers

Cationic polymers particularly suited for use in this invention have a backbone prepared from ethylenically unsaturated units and having at least one, and preferably more than three, pendant ionic moieties derived from a cationic unit on the monomer and being of the general formula:

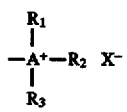

wherein A is N, P, or S; $R_1$–$R_3$ are each independently H, alkyl or alkyl ether of 1–20 carbon atoms, or aryl or alkylaryl having 1–9 carbon atoms, with the proviso that $R_3$ is not present when A is S; and wherein X is an anion selected from the group consisting of halides, conjugate bases of organic acids, and conjugate bases of inorganic acids. The number of pendant ionic moieties should be sufficient to make the salt form of the cationic polymer soluble in the aqueous carrier medium. It will vary depending on the molecular weight of the polymer. The cationic polymer may also contain non-ionic ethylenically unsaturated monomers.

Preferred cationic polymers are the phosphate and tetraalkylammonium salts of homopolymers or copolymers of dialkylaminoethyl methacrylate, where alkyl is methyl to butyl. An especially useful cationic polymer is an AB block polymer with an A block prepared from homopolymers or copolymers of methyl methacrylate (MMA) and butyl methacrylate (BMA) and a B block prepared from homopolymers or copolymers of dimethylaminoethyl methacrylate (DMAEMA) or diethylaminoethyl methacrylate. Block polymers of MMA//MMA/DMAEMA (10//5/7.5) and BMA//DMAEMA (10//10) are particularly preferred, wherein a double slash indicates a separation between blocks, a single slash indicates a random copolymer, and the numerical values indicate the degree of polymerization of each monomer.

Anionic Polymer

Anionic polymers particularly suited for use in this invention have a backbone prepared from ethylenically unsaturated units and have at least one, and preferably more than three, pendant ionic moieties derived from the anionic unit on the monomer and being of the general formula:

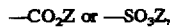

$$-CO_2Z \text{ or } -SO_3Z,$$

wherein Z is selected from the group of conjugate acids of organic bases, alkali metal ions, ammonium ion, and tetraalkylammonium ions. The number of pendant ionic moieties should be sufficient to make the salt form of the anionic polymer soluble in the aqueous carrier medium. It will vary depending on the molecular weight of the polymer. The anionic polymers may also include non-ionic monomers.

Useful anionic polymers include copolymers of styrene and maleic acid and their mono esters, AB block polymers wherein the A block comprises homopolymers or copolymers prepared from methyl methacrylate (MMA) or butyl methacrylate (BMA) and a B block comprises homopolymers or copolymers prepared from methacrylic acid. Particularly preferred anionic polymers are AB block polymers with an A block prepared from homopolymers or copolymers of methyl methacrylate (MMA) and butyl methacrylate (BMA) and a B block prepared from homopolymers or copolymers of methacrylic acid. Particularly preferred are AB block polymers of BMA//BMA/MAA (10//5/10) and BMA//MAA (10//10).

OTHER INGREDIENTS

The ink compositions may also contain other ingredients. For example, the surfactants may be used to alter surface tension as well as maximize penetration. However, as is known in the art, surfactants may destabilize the pigment dispersion. In addition, it has been observed that the use of surfactants may cause an increase in the amount of bleed over what would be present if the surfactants had not been present. Accordingly, the use of surfactants may tend to negate the advantages offered by the present invention. However, if it is otherwise desirable or necessary for a surfactant to be present, it has been discovered that the adverse effects of the surfactant on bleed can be minimized or eliminated by adding additional polymer.

Water soluble alkyltrimethylammonium salts, wherein the alkyl contains from 8–16 carbon atoms, such as dodecyltrimethyl ammonium chloride, for example, have been found to be effective in further reducing bleed when added to cationic pigmented inks. Preferably a C12 alkyl is used because below 12 carbons bleed is compromised and above 12 dispersion stability is compromised. Similarly, the use of water soluble sulfonate salts, namely dialkylsulfosuccinates, wherein the alkyl comprises 4 to 10 carbon atoms, and alkyl naphthalene sulfonates, wherein the alkyl comprises 1 to 6 carbon atoms, when added to anionic inks, have been found effective at further reducing bleed. Whether the use of such compounds is indicated in a particular circumstance depends upon the other components present in the ink and a balancing of the improved bleed performance with other properties of the ink, such as decap and storage stability.

Biocides may be used in the ink compositions to inhibit growth of microorganisms, as is well known in the art. In addition, sequestering agents such as EDTA may also be included to eliminate deleterious effects of heavy metal impurities. Other known additives, such as humectants, viscosity modifiers and other acrylic or non-acrylic polymers made also be added to improve various properties of the ink compositions as is known in the art.

The ink compositions of the present invention are prepared in the same manner as other ink jet ink compositions. If a pigment dispersion is used as the colorant, the dispersion is prepared by premixing the selected pigment(s) and dispersant in water. The dispersion step may be accomplished in a horizontal mini mill, a ball mill, a 2 roll mill, an attritor, or by passing the mixture through a plurality of nozzles within a liquid jet interaction chamber at a liquid pressure of at least 5000 psi to produce a uniform dispersion of the pigment particles in the aqueous carrier medium. Other cosolvents may be present during the dispersion step.

If a dye is used as the colorant, there is no dispersant present and no need for pigment deaggregation. The dye-based ink is prepared in a well agitated vessel rather than in dispersing equipment.

MULTIPLE COLORS

A compromise must be made when practicing the invention with more than two ink colors. Typically one will make the most important ink of one charge characteristic (i.e., anionic or cationic), and make the other inks of the other charge characteristic. For example, black may be the most important color because sharp edges are desired for text quality, in which case black ink will have one charge characteristic, and the other inks will be of the other charge characteristic since color bleed may not be as critical for graphics.

INK PROPERTIES

Jet velocity, separation length of the droplets, drop size and stream stability are greatly affected by the surface tension and the viscosity of the ink. Pigmented ink jet inks suitable for use with ink jet printing systems should have a surface tension in the range of about 20 dyne/cm to about 70 dyne/cm and, more preferably, in the range 30 dyne/cm to about 70 dyne/cm at 20° C. Acceptable viscosities are no greater than 20 cP, and preferably in the range of about 1.0 cP to about 10.0 cP at 20° C. The ink has physical properties compatible with a wide range of ejecting conditions, i.e., driving voltage and pulse width for thermal ink jet printing devices, driving frequency of the piezo element for either a drop-on-demand device or a continuous device, and the shape and size of the nozzle. The inks have excellent storage stability for a long period and do not clog in an ink jet apparatus. Fixing of the ink on the image recording material, such as, paper, fabric, film, etc., can be carried out speedily and surely. The printed ink images have clear color tones, high density, excellent water resistance and light fastness. Further the ink does not corrode parts of the ink jet printing device it comes in contact with, and it is essentially odorless, and non-toxic.

EXAMPLES

Polymer Preparation

Preparation 1

MMA//MMA/DMAEMA (10//5/7.5) AB block polymer at 53.6% solids and a Mn=2700 was prepared as described below:

A 12-liter flask was equipped with a mechanical stirrer, thermometer, $N_2$ inlet, drying tube outlet, and addition funnels. Tetrahydrofuran THF, 3943 gm, and p-xylene, 2.4 gm, were charged to the flask. The catalyst, tetrabutyl ammonium-chlorobenzoate (2.6 ml of a 1.0M solution in acetonitrile) was then added. Initiator, 1-methoxy-1-trimethylsiloxy-2-methyl propene, 274.1 gm (1.57M) was injected. Feed I [methyl methacrylate MMA, 780 gm (7.8M), and 2-dimethylaminoethyl methacrylate DMAEMA, 1846 gm (11.76M)] was started at 0.0 minutes and added over 45 minutes. One hundred minutes after Feed I was completed (over 99% of the monomers had reacted), Feed II [methyl methacrylate, 1556 gm (15.6 M) was started and added over 30 minutes.

At 400 minutes, 546 gm of dry methanol were added to the above solution and distillation was begun. A total of 2025 gm of solvent was removed. I-propanol, 1331 gm, was added after completion of the distillation.

The above polymer was neutralized or quaternized using one of the following procedures:

Procedure A: Phosphoric Acid

The block polymer prepared above was neutralized (906%) by adding 17.2 gm of 85% phosphoric acid to 102.5 gm of the polymer solution and mixing until a homogeneous solution was obtained. After neutralization, the material was reduced to approximately 25% solids with deionized water. The pH was 2.8.

Procedure B: Quaternization with Benzyl Chloride

A 3-liter flask was equipped with a mechanical stirrer, thermometer, $N_2$ inlet, drying tube outlet, and addition funnels. The polymer from Preparation 1, 1590 gm (2.30M of amine), was charged to the flask. Benzyl chloride, 272 gm (2.14M) was added over 30 minutes. The polymer solution was then heated to reflux for 6 hours. The amine value drops from 2.70 milliequivalents of amine/gm of solid polymer to 0.16 milliequivalents of amine/gm of polymer.

I-propanol, 400 gm, was then added to make a benzyl chloride quaternized polymer of MMA//MMA/DMAEMA (10//5/7.5) at 51.8% solids and a mol weight of 3650. The amine group was now quaternized and had a benzyl group attached to it. A chloride ion was the counter ion. The material was reduced to approximately 25% solids with deionized water. The pH was 7.0.

Preparation 2

BMA//MAA (10//10) AB block polymer of 2400 Mn and 52.% solids was prepared using the procedure outlined below:

A 12-liter flask was equipped with a mechanical stirrer, thermometer, $N_2$ inlet, drying tube outlet, and addition funnels. Tetrahydrofuran THF, 3750 gm, and p-xylene, 7.4 gm, were charged to the flask. The catalyst tetrabutyl ammonium m-chlorobenzoate (3.0 ml of a 1.0M solution in acetonitrile) was then added. Initiator, 1,1-bis (trimethylsiloxy)-2-methyl propene, 291.1 gm (1.25M) was injected. Feed I [tetrabutyl ammonium m-chlorobenzoate, 3.0 ml of a 1.0M solution in acetonitrile] was started and added over 150 minutes. Feed II [trimethylsilyl methacrylate, 1976 gm (12.5M)] was started at 0.0 minutes and added over 35 minutes. One hundred and eighty minutes after Feed II was completed (over 99% of the monomers had reacted) Feed III [butyl methacrylate, 1772 gm (12.5M) was started and added over 30 minutes.

At 400 minutes, 780 gm of dry methanol were added to the above solution and distillation begun. During the first stage of distillation, 1300.0 gm of material with a boiling point of below 55° C were removed from the flask. The theoretical amount of methoxytrimethylsilane (BP=54° C.) to be removed was 1144.0 gm. Distillation continued during the second stage while the boiling point increased to 76° C. I-propanol, 5100 gm total, was added during the second stage of distillation. A total of 8007 gm of solvent were removed.

Neutralization

The BMA//MAA (10//10) polymer prepared above was neutralized to the 88% level by adding 30.61 gm of 45% potassium hydroxide to 115.16 gm of the block polymer solution and 454.23 gm of deionized water and mixing until a homogeneous 10% solution was obtained.

Polymer Preparation 3

This shows the preparation of a BMA/MMA//MAA 10/5//10 diblock polymer.

A 12-liter flask was equipped with a mechanical stirrer, thermometer, N2 inlet, drying tube outlet, and addition funnels. Tetrahydrofuran THF, 3027 gm, and p-xylene, 2.4 gm, were charged to the flask. The catalyst tetrabutyl ammonium m-chlorobenzoate, 2.5 ml of a 1.0M solution in acetonitrile, was then added. Initiator, 1,1-bis (trimethylsiloxy)-2-methyl propene, 234.4 gm (1.01M) was injected. Feed I [tetrabutyl ammonium m-chlorobenzoate, 2.5 ml of a 1.0M solution in acetonitrile] was started and added over 150 minutes. Feed II [trimethylsilyl methacrylate, 1580 gm (1.00M)] was started at 0.0 minutes and added over 38 minutes. Fifty-five minutes after Feed II was completed (over 99% of the monomers had reacted) Feed III [butyl methacrylate, 1425.0 gm (10.0M), and methyl methacrylate, 503 gm (5.0M)] was started and added over 30 minutes.

At 400 minutes, 646 gm of dry methanol were added to the above solution and distillation was begun. During the first stage of distillation, 1000.0 gm of material with a boiling point of below 55° C. were removed from the flask. I-propanol, 1182.0 gm total, was added during the second stage of distillation. A total of 2792 gms of solvent was removed. This made a BMA/MMA//MAA 10/5//10 AB block polymer at 50.4% solids with a Mn=2,870

Polymer Preparation 4

This shows the preparation of a BZMA//DMAEMA 10//20 diblock polymer.

A 12-liter flask was equipped with a mechanical stirrer, thermometer, N2 inlet, drying tube outlet, and addition funnels. Tetrahydrofuran THF, 4002 gm, and p-xylene, 7.7 gm, were charged to the flask. The catalyst tetrabutyl ammonium m-chlorobenzoate, 2.0 ml of a 1.0M solution in acetonitrile, was then added. Initiator, 1-methoxy-1-trimethylsiloxy-2-methyl propene, 155.1 gm (0.891M) was injected. Feed I [2-dimethylaminoethyl methacrylate DMAEMA, 2801 gm (17.8M)] was started at 0.0 minutes and added over 45 minutes. One hundred minutes after Feed I was completed (over 99% of the monomers had reacted) Feed II (benzyl methacrylate, 1568 gm (8.91M) was started and added over 30 minutes.

At 400 minutes, 310 gm of dry methanol were added to the above solution and distillation begins. 1725 gm of solvent were removed. I-propanol, 1783 gm, was added after completion of the distillation. This made a BZMA//DMAEMA 10//20 diblock polymer at 49.6% solids and a Mn=5000.

Pigment Dispersion Concentrates were prepared using the following procedures:

Cyan Pigment Dispersion Concentrate 1

A cyan pigment dispersion was prepared using the following procedure:

The following ingredients were mixed:

| INGREDIENT | AMOUNT (GM) |
| --- | --- |
| Polymer from Preparation 3 (55.92% solids) | 215.0 |
| Pigment Blue 15:4 (Endurophthal ® BT-617-D from Cookson Pigments, Newark, N.J.) | 180.0 |
| Diethylene glycol | 30.0 |

The following ingredients were mixed and the mixture was then charged to a 2 roll mill and processed for 30 minutes. This made a pigment dispersion that contained 56.07% pigment, 37.38% polymer, and 6.55% diethylene glycol. It had a P/B=1.5/1. This 2 roll mill chip was then dissolved using potassium hydroxide as the neutralizing agent to make an aqueous cyan pigment concentrate.

An anionic aqueous cyan pigment dispersion concentrate was prepared by mixing the following ingredients with adequate stirring:

| INGREDIENT | AMOUNT (GM) |
| --- | --- |
| Cyan Pigment dispersion 1 | 71.34 |
| Potassium hydroxide (45.5% solids) | 11.34 |
| Deionized water | 317.0 |

This made an aqueous, cyan pigment concentrate 1 that contained 9.93% pigment and had 90 mole % of the acid groups from the polymer neutralized with potassium hydroxide.

Cyan Pigment Dispersion Concentrate 2

A cyan pigment dispersion was prepared using the following procedure:

| INGREDIENT | AMOUNT (GM) |
| --- | --- |
| Polymer from Preparation 4 (50.22% solids) | 398 |
| Pigment Blue 15:4 (Heliogen ® D7072DD pigment, from BASF Corp, Parsippany, N.J.) | 300 |

This above ingredients were mixed and the mixture was then charged to a 2-roll mill and processed for 60 minutes. This made a pigment dispersion that contained 60% pigment and 40% polymer. It had P/D=1.5/1. This 2-roll mill chip was then dissolved in phosphoric acid as the neutralizing agent to make an aqueous pigment concentrate.

A cationic aqueous cyan pigment dispersion concentrate was prepared by mixing the following ingredients with adequate stirring:

| INGREDIENT | AMOUNT (GM) |
| --- | --- |
| Cyan pigment dispersion 2 | 66.7 |
| Phosphoric acid (85.6% solids) | 10.96 |
| Deionized water | 322.0 |

This made an aqueous cyan pigment concentrate 2 that contained 10.02% pigment and had 90 mole % of the amine groups from the polymer neutralized with phosphoric acid.

Magenta Pigment Dispersion Concentrate 1

A magenta pigment dispersion was prepared using the following procedure:

| INGREDIENT | AMOUNT (GM) |
| --- | --- |
| Polymer from Preparaton 4 (55.91% solids) | 357.72 |
| Pigment Red 122 (59.9% solids presscake sold as 428-5024 from Sun Chemical Corp., Cincinnati, OH) | 500.83 |

The following ingredients were mixed and the mixture was then charged to a 2 roll mill and processed for 40 minutes at 121° C. This made a pigment dispersion that contained 60% pigment and 40% polymer. It had P/B=1.5/1. This 2 roll mill chip was then dissolved using phosphoric acid as the neutralizing agent to make an aqueous pigment concentrate.

A cationic aqueous magenta pigment dispersion concentrate was prepared by mixing the following ingredients with adequate stirring:

| INGREDIENT | AMOUNT (GM) |
| --- | --- |
| Magenta Pigment dispersion 1 | 66.7 |
| Phosphoric acid (85% solids) | 10.96 |
| Deionized water | 322.3 |

This made an aqueous magenta pigment concentrate 1 that contained 10.23% pigment and had 90 mole % of the amine groups from the polymer neutralized with phosphoric acid.

Yellow Pigment Dispersion Concentrate 1

A yellow pigment dispersion was prepared using the following procedure:

| INGREDIENT | AMOUNT (GM) |
| --- | --- |
| Polymer from Preparation 4 (55.9% solids) | 447.15 |
| Pigment Yellow 14 (Spectra ® Pac W 274-1788 pigment from Sun Chemical Corporation, Cincinnati, OH) | 250.0 |

The following ingredients were mixed and the mixture was then charged to a 2 roll mill and processed for 30 minutes at 150 deg F. This made a pigment dispersion that contained 50% pigment and 50% polymer. It had a P/B=1/1. This 2 roll mill chip was the dissolved using phosphoric acid as the neutralizing agent to make an aqueous yellow pigment concentrate.

A cationic aqueous yellow pigment dispersion concentrate was prepared by mixing the following ingredients with adequate stirring:

| INGREDIENT | AMOUNT (GM) |
| --- | --- |
| Yellow pigment dispersion (from 2 roll mill process) | 80.0 |
| Phosphoric acid (85.6% solids) | 16.43 |
| Deionized water | 303.57 |

This made an aqueous, yellow pigment concentrate 1 that contained 9.81% pigment and had 90 mole % of the amine groups from the polymer neutralized with phosphoric acid.

Ink Preparation

Cationic Ink 1

A cationic, pigment-based black ink was prepared by mixing 40 gm of block polymer from Preparation 1 (25% solution neutralized by Procedure A) with 20 gm of black pigment FW-18 (Degussa Corp., Ridgefield Park, N.J.) and 140 gm of deionized water. This mixture was then charged to a minimill 100 (Eiger Machinery Inc., Bensenville, Ill.) and milling was carried out at 3500 RPM for one hour, giving a pigment dispersion that had 10% pigment and a 2:1 pigment:block polymer ratio. ("2/1 P/B")

An ink containing 3.5% pigment and 1.75% polymer dispersant was prepared by mixing 35 gm of this dispersion with 5 gm of Liponic EG-1 (Lipo Chemicals, Inc., Paterson, N.J.), 5 gm of diethylene glycol and 55 gm of deionized water with stirring.

Cationic Ink 2

A cationic, pigment-based black ink was prepared by mixing 54.4 gm of block polymer from in Preparation 1 (25% solution quaternized by Procedure B) with 27.2 gm of black pigment FW-18 and 118.4 gm of deionized water. This mixture was then charged to a minimill 100 (Eiger Machinery Inc., Bensenville, Ill.) and milling was carried out at 3500 RPM for one hour. This made a pigment dispersion that had 10% pigment and a 2/1 P/B.

An ink containing 3.5% pigment and 1.75% polymer dispersant was prepared by stirring together 25.73 gm of this dispersion with 5 gm of Liponic EG-1, 5 gm of diethylene glycol and 64.27 gm of deionized water.

Cationic Ink 3

A cationic yellow ink was created by mixing 2 gm of Auramine O with 3 gm of block polymer from Preparation 1 (25% solution neutralized with phosphoric acid), 10 gm of butyl carbitol, 0.3 gm of biocide and 84.7 gm of deionized water.

Cationic Ink 4

A cationic magenta ink was prepared by adding 1.5 gm of Rhodamine B to an aqueous solution containing 8% butyl carbitol, 0.3% biocide and 90.2% deionized water.

Cationic Ink 5

A cationic cyan ink was prepared with the following ingredients:

| INGREDIENT | AMOUNT (GM) |
| --- | --- |
| 2-Ethyl-2-(Hydroxymethyl)-1,3-propanediol | 10.0 |
| 2,2-dimethyl-1-propanol | 2.0 |
| Liponics ® EG-1 | 5.0 |
| Cyan Pigment Dispersion Concentrate 2 | 20.0 |
| Deionized water | 63.0 |

All these components were mixed with adequate stirring. This made an ink of 2.0% pigment and 1.5% polymer.

Cationic Ink 6

A cationic magenta ink was prepared using the procedure for making Cationic Ink 5 with the following exceptions: the Magenta Pigment Dispersion concentrate 1 was used instead of the Cyan Pigment Dispersion Concentrate 2. The ink contained 2.0% pigment and 1.5% polymer.

Cationic Ink 7

A cationic yellow ink was prepared with the following ingredients:

| INGREDIENT | AMOUNT (GM) |
| --- | --- |
| 2-Ethyl-2-(Hydroxymethyl)-1,3-propanediol | 10.0 |
| 2,2-dimethyl-1-propanol | 2.0 |
| Liponics ® EG-1 | 5.0 |
| Yellow Pigment Dispersion Concentrate 1 | 30.0 |
| Deionized water | 53.0 |

All components were stirred adequately. The ink contained 3.0% pigment and 3.0% polymer.

Anionic Ink 1

An anionic pigment-based black ink was prepared by mixing 100 gm of block polymer from Preparation 2 (10% solution neutralized with KOH) with 20 gm of black pigment FW-18 and 80 gm of deionized water. This mixture was then charged to a minimill 100 and milling was carried out at 3500 RPM for one hour. The final dispersion had 10% pigment and a 2/1 P/B.

An ink containing 3.5% pigment and 1.75% polymer was prepared by mixing 35 gm of this dispersion concentrate with 5 gm of Liponic EG-1, 1 gm of Silwet® L-77 (Union Carbide, Inc., Danbury, Conn.), 0.3 gm of Nuosept® G95 (Huls America, Inc., Piscataway, N.J.), 5 gm of diethylene glycol and 53.7 gm of deionized water.

Anionic Ink 2

An anionic dye-based cyan ink was prepared by mixing 2 gm of concentrated and purified Acid Blue 9 (CAS #3844-45-9) with a solution comprising 8 gm of butyl carbitol and 90 gm of deionized water.

Anionic Ink 3

An anionic dye-based magenta ink was prepared by the procedure described for preparing Anionic Ink 2, except that Reactive Red 180 was used in place of the cyan dye.

Anionic Ink 4

An anionic dye-based yellow ink was prepared by the procedure described for preparing Anionic Ink 2, except that Acid Yellow 23 (CAS #1934-21-0) was used in place of the cyan dye.

Anionic Ink 5

Using a dispersion of Heucophthal Blue G pigment (Heubach Chemicals, Inc., Newark, N.J.) and block polymer from Preparation 2, a pigment ink containing 1.5% pigment and 1.5% polymer was prepared in an aqueous solution comprising 8% butyl carbitol, 0.3% Nuosept® 95 and 88.7% deionized water.

Anionic Ink 6

An anionic dye-based cyan ink was prepared using the procedure described for Anionic Ink 2, except that 0.3 gm of Nuosept® 95 was added and the deionized water was reduced to 89.7 gm. After the dye addition, the Nuosept® 95 was added to prevent bacterial growth in the ink.

Anionic Ink 7

An anionic dye-based magenta ink was prepared by the procedure described for preparing Anionic Ink 6, except that Acid Red 180 was used in place of the cyan dye.

Anionic Ink 8

An anionic dye-based yellow ink was prepared by the procedure described for preparing Anionic Ink 6, except that Acid Yellow 23 was used in place of the cyan dye.

Anionic Ink 9

An anionic dye-based black ink was prepared by mixing 2.5 gm of Food Black 2 with 5.5 gm of diethylene glycol, 0.1 gm of biocide and 91.9 gm of deionized water.

Anionic Ink 10

An anionic black ink was formulated by mixing 2.5 gm of Food Black 2 with 5.5 gm of diethylene glycol, 3 gm of block polymer from Preparation 2 (10% solution neutralized with KOH), 0.1 gm of biocide and 88.9 gm of deionized water.

Anionic Ink 11

An anionic cyan ink was prepared using the following ingredients:

| INGREDIENT | AMOUNT(GM) |
| --- | --- |
| 2-Ethyl-2-(Hydroxymethyl)-1,3-propanediol | 10.0 |
| 2,2-dimethyl-1-propanol | 2.0 |
| Liponics ® EG-1 | 5.0 |
| Cyan Pigment Dispersion 1 Concentrate | 20.0 |
| Deionized water | 63.0 |

All these components were mixed with adequate stirring. This made an ink of 2.0% pigment and 1.5% polymer.

CONTROL 1

A control printed element was prepared using a black anionic pigment ink and anionic color dye-based inks, with black ink next to color ink, by the following method:

A 15 gram sample of the Anionic Ink 1 was filled into the ink reservoir of a thermal ink jet pen with a 50 micron square resistor and a 34 micron orifice opening. Approximately 15 grams of each color ink (cyan—Anionic Ink 2, magenta—Anionic Ink 3, and yellow—Anionic Ink 4) were then added to the ink reservoir of three separate thermal ink jet pens with 47 micron square resistors and a 36 micron orifice.

The pens were then loaded into a 4 pen printer mechanism. A sample was then printed where a cross pattern of the black ink was surrounded by first cyan, then yellow, then magenta, next green, and finally a red block of color, with the color inks in close proximity to the black ink.

The sample was printed using several different print modes. The print modes differed in the number of passes that were used to complete each color. Two, three, four, six, and eight pass print modes were used. The two pass print mode printed 50% of each color in each pass while the eight pass print mode printed approximately 12.5% of the total color with each pass. As the number of passes was increased, bleed between black and color was reduced but the time needed to print the sample was increased. Bleed was measured by visually comparing the sample to a series of standards. Bleed was judged to be acceptable or not acceptable with each different print mode used.

Results are shown in Table 1 below.

EXAMPLE 1

Control 1 was repeated using Cationic Ink 1 instead of Anionic Ink 1. Results are shown in Table 1 below.

EXAMPLE 2

Example 1 was repeated, except that Anionic Ink 5 was used instead of Anionic Ink 2. Pens having Anionic Inks 3 and 4 were not loaded in the printer. The cross pattern of black ink was surrounded by the cyan pigment-based ink in close proximity. Results are shown in Table 1.

EXAMPLE 3

Example 1 was repeated with the following exceptions: Anionic Inks 6, 7 and 8 were used instead of Anionic Inks 2, 3, and 4. Results are shown in Table 1.

EXAMPLE 4

Example 3 was repeated using Cationic Ink 2 instead of Cationic Ink 1. Results are reported in Table 1.

EXAMPLE 5

Control 1 was repeated with the following exception: Cationic Ink 4 was used instead of Anionic Inks 2, 3, and 4. Results are shown in Table 1.

TABLE 1

| Example No. | Black Ink | Color Ink | Bleed Results |
| --- | --- | --- | --- |
| Control | A1 | A2, A3, A4 | fails at 2, 3, 4, 6, and 8 pass print modes |
| 1 | C1 | A2, A3, A4 | acceptable bleed with 2, 3, 4, 6, and 8 pass print modes |
| 2 | C1 | A5 | acceptable bleed with 2, 3, 4, 6, and 8 pass print modes |
| 3 | C1 | A6, A7, A8 | acceptable bleed with 2, 3, 4, 6, and 8 pass print modes |
| 4 | C1 | A6, A7, A8 | acceptable bleed with 2, 3, 4, 6, and 8 pass print modes |
| 5 | A1 | C4 | bleed reduced at 4 passes |

CONTROL 2

A 15 gram sample of a black anionic ink (Anionic Ink 9) was filled into the ink reservoir of a thermal ink jet pen with a 61 micron square resistor and a 52 micron orifice opening. Approximately 15 grams of a yellow anionic ink (Anionic Ink 8) was added to the ink reservoir of a thermal ink jet pen with a 47 micron square resistor and a 34 micron orifice.

The pens were then loaded into a 4 pen printer mechanism. A sample was then printed where a cross pattern of the black ink was surrounded by the anionic color dye, with the color ink placed in close proximity to the black ink.

The sample was printed using a four pass print modes. The four pass print mode printed 25% of each color in each pass. The bleed was measured as in Control 1. Results are reported in Table 2.

EXAMPLE 6

Control 2 was repeated, except that Cationic Ink 3 was used instead of Anionic Ink 8 and the pen for Cationic Ink had a 45 micron square resistor and a 36 micron orifice. Results are reported in Table 2.

EXAMPLE 7

Example 6 was repeated with the exception that Anionic Ink 10 was used instead of Anionic Ink 9. Results are reported in Table 2.

CONTROL 3

Example 7 was repeated using Anionic Ink 7 instead of Cationic Ink 3. Results are reported in Table 2.

EXAMPLE 8

Control 3 was repeated using Cationic Ink 4 instead of Anionic Ink 7. Results are reported in Table 2.

TABLE 2

| Example No. | Black Ink | Color Ink | Bleed Results |
|---|---|---|---|
| Control 2 | A9 | A8 | Unacceptable. Bleed area = 12.4% |
| 6 | A9 | C3 | Unacceptable. Bleed area = 8.1% |
| 7 | A10 | C3 | Acceptable. Bleed area = 4.9% |
| Control 3 | A10 | A7 | Unacceptable. |
| 8 | A10 | C4 | Acceptable. |

A 15 gram sample of black anionic pigment ink (Anionic Ink 1) was filled into the ink reservoir of a thermal ink jet pen with a 61 micron square resistor and a 52 micron orifice opening. Approximately 15 grams of a yellow anionic ink (Anionic Ink 8) was added to the ink reservoir of a thermal ink jet pen with a 47 micron square resistor and a 34 micron orifice.

The pens were then loaded into a pen printer mechanism. A sample was then printed where a cross pattern of the black ink was surrounded by the yellow ink, with the color ink in close proximity to the black ink.

The sample was printed using a 1, 2, 3, and 4 pass print modes. The four pass print mode printed 25% of each color in each pass. The bleed was measured as in Control 1. Results are reported in Table 3

EXAMPLE 9

Control 4 was repeated using Cationic Ink 5 instead of Anionic Ink 8 and a pen with a 45 micron square resistor and a 36 micron orifice was used for Cationic Ink 5. Results are reported in Table 3.

TABLE 3

| Example No. | Black Ink | Color Ink | Bleed Area (Percent) |
|---|---|---|---|
| Control 4 | A1 | A8 | 17.5 at 2 passes 14.9 at 4 passes |
| 9 | A1 | C5 | 7.8 at 2 passes 7.7 at 4 passes |

EXAMPLE 10

Three cationic pigmented inks were prepared having the following compositions, expressed as a weight percent of the total ink composition:

| | Sample | | |
|---|---|---|---|
| Ingredient | 10A | 10B | 10C |
| FW-18 black pigment | 3.5 | 3.5 | 3.5 |
| Liponic EG-1 | 4.7 | 4.7 | 4.7 |
| diethylene glycol | 4.7 | 4.7 | 4.7 |
| biocide | 0.3 | 0.3 | 0.3 |
| polymer dispersant | 1.75 | 1.75 | 1.75 |
| water | 85.05 | 85.05 | 85.05 |
| pH | 6.59 | 6.69 | 6.42 |

The dispersant used for ink 10A comprised BMA//DMAEMA 10//10 quaternized by Procedure B; for ink 10B comprised BMA//DMAEMA 10//20 quaternized by Procedure B; and for ink 10C comprised EHMA//DMAEMA 10//10 quaternized by Procedure B. These inks were printed adjacent anionic dye-based inks comprising 15% by weight 2-ethyl-2-(hydroxymethyl)-1,3-propanediol ("EHPD"), 8% by weight Butyl Carbitol, 0.3% by weight biocide, from 2.25 to about 3.25% by weight anionic dye (e.g., Acid Yellow 23, Acid Blue 9, etc.) and the remainder water. The pH of the anionic inks ranged from 6 to 7.5.

Bleed was evaluated at 1, 2 and 3 passes. Results are reported in Table 4. A score of 6 is considered marginally acceptable.

TABLE 4

| Sample No. | Bleed Results | | |
|---|---|---|---|
| | 1 pass | 2 pass | 3 pass |
| 10A | 7.9 | 5.9 | 5.0 |
| 10B | 7.8 | 6.1 | 4.7 |
| 10C | 7.3 | 2.6 | 3.6 |

CONTROL 5

A control print sample was prepared by the following method using Cationic Inks 5–7:

A 15 gram sample of each cationic ink was added to three separate reservoirs of ink-jet pens with a 61 um resistor and 45 um orifice. All the pens were appropriately loaded into a four pen printing mechanism (PaintJet® XL300, Hewlett-Packard). The black stall was not used. Samples were printed without a heater or fan. A print pattern was generated comprising six different color boxes(2"×2") of red, green, blue, cyan, yellow, and magenta. Print samples were made on Hammermill Fore® DP Paper (Hammermill Paper Company, Erie, Pa.)(HM) and Recyconomic Copy Z-Weckform® Paper, (Zweckform Buro-Produckte Gessellschaft Mit Beschrankter Haftung, Oberlaindern, Germany) (ZF).

Color measurements were done with a Minolta CR221 (Minolta Camera Co.,Ltd., Japan). Measurement conditions used Illuminant C with a 45° illuminant angle and a 0° observer angle. Color measurements are listed in L*C*H notation. See Hewlett-Packard Journal, Volume 43, No. 4, August 1992. Increasing values for chroma(C*) indicate improved color (higher vividness of color) while decreasing values for lightness(L*) can indicate increased color density. Doing both simultaneously is even more desirable. Color results are listed in Table 5.

EXAMPLE 11

A print sample was prepared by the following procedure using Anionic ink 11 and Cationic inks 6 and 7:

A 15 gram sample of Anionic Ink 11 was added to the reservoir of an ink-jet pen with a 61 um resistor and 45 um orifice. This pen then replaced the Cationic Ink 5 (cyan) in the above four pen printer configuration. Print samples were then generated and measured as described in Control 5. Results are shown in Table 5 below.

TABLE 5

Color measurements.

| SAMPLE | PAPER | COLOR | L*[1] | C*[1] | H |
|---|---|---|---|---|---|
| Control 5 | HM | Cyan | 58 | 43 | 262 |
| | | Yellow | 90 | 84 | 98 |
| | | Magenta | 59 | 50 | 349 |
| | | Red | 58 | 50 | 37 |
| | | Green | 55 | 44 | 153 |
| | | Blue | 45 | 33 | 287 |
| Example 11 | HM | Cyan | 58 | 41 | 258 |
| | | Yellow | 90 | 86 | 98 |
| | | Magenta | 58 | 51 | 350 |
| | | Red | 56 | 52 | 35 |
| | | Green | 50 | 46 | 152 |
| | | Blue | 37 | 41 | 293 |
| Control 5 | ZF | Cyan | 53 | 36 | 256 |
| | | Yellow | 82 | 72 | 98 |
| | | Magenta | 55 | 45 | 352 |
| | | Red | 54 | 46 | 35 |
| | | Green | 49 | 38 | 158 |
| | | Blue | 41 | 30 | 290 |
| Example 11 | ZF | Cyan | 53 | 37 | 251 |
| | | Yellow | 82 | 72 | 98 |
| | | Magenta | 54 | 46 | 352 |
| | | Red | 54 | 46 | 35 |
| | | Green | 47 | 43 | 157 |
| | | Blue | 31 | 42 | 294 |

*[1]One to two units are considered within the noise range of the instrument. Anything over (+/−) 2 is considered measurable.

Table 5 demonstrates improvements in the secondary colors (blues and greens) that were obtained on Hammermill Fore® DP Paper (HM) and Recyconomic Z-weckform® Paper (ZM) when employing an anionic cyan ink with cationic yellow and magenta inks. For example, a 5 unit improvement in chroma was achieved for green on the ZF paper (43 in Example 11 v 38 in Control 5) and a 12 unit improvement in chroma for blue (42 in Example 11 v 30 in Control 5). The results will vary with the paperstock selected, as illustrated by the chroma values obtained on HM paper: green 46 Example 11 v 44 Control 5, a 2 unit improvement; and blue 41 Example 11 v. 33 Control 5, an 8 unit improvement. The data also illustrates improved lightness (L)—i.e., decreasing values—thereby obtained.

What is claimed is:

1. A process for creating a multicolor printed element having reduced color bleed, comprising the steps, in any order, of:

(a) applying an anionic ink to an element, said anionic ink comprising an aqueous medium and a colorant and being free of polymer; and (b) applying a cationic ink to said element and in contact with said anionic ink, said cationic ink comprising an aqueous carrier medium and a pigment dispersion, wherein said pigment dispersion comprises a pigment and about 0.1 to 30% by weight of a cationic polymer dispersant.

2. The process of claim 1, wherein said polymer is a homopolymer, copolymer, block polymer, branched polymer or graft polymer.

3. The process of claim 2 wherein said polymer has an ethylenically unsaturated backbone and a molecular weight below 20,000.

4. The process of claim 3 wherein said cationic polymer has at least one pendant ionic moiety of the formula:

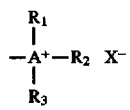

wherein A is selected from the group consisting of N, P, and S; $R_1$, $R_2$ and $R_3$ are independently selected from the group consisting of H, alkyl or alkyl ether of 1–20 carbon atoms, aryl or alkylaryl of 1–10 carbon atoms, wherein $R_3$ is not present when A is S; and wherein X is selected from the group consisting of halides, conjugate bases of organic acids, and conjugate bases of inorganic acids.

5. The process of claim 4, wherein the cationic polymer is an AB block polymer.

6. The process of claim 5, wherein the cationic AB block polymer comprises an A block prepared from homopolymers or copolymers of methyl methacrylate and butyl methacrylate and a B block prepared from homopolymers or copolymers of dimethylaminoethyl methacrylate and diethylaminoethyl methacrylate.

7. The process of claim 1 further comprising the step of applying additional printing liquids adjacent to the anionic or cationic inks.

8. The process of claim 1, wherein said cationic ink contains a water soluble alkyltrimethyl ammonium salt.

9. The process of claim 8, wherein said ammonium salt is dodecyltrimethyl ammonium chloride.

10. The process of claim 1, wherein said anionic ink contains a sulfonate salt selected from the group consisting of dialkylsulfosuccinates and alkyl naphthalene sulfonates.

11. The process of claim 1, wherein said anionic ink and cationic inks abut on said element.

12. The process of claim 1, wherein said anionic and cationic inks are in an overlay relationship.

13. An inkset comprising, in combination:

(a) an anionic ink comprising an aqueous medium and a colorant and being free of polymer, and (b) a cationic ink comprising an aqueous medium and a pigment dispersion, wherein said pigment dispersion comprises a pigment and about 0.1 to 30% by weight of a cationic polymer dispersant.

14. The inkset of claim 13, wherein said polymer is a homopolymer, copolymer, block polymer, branched polymer or graft polymer.

15. The inkset of claim 14, wherein said polymer has an ethylenically unsaturated backbone and a molecular weight below 20,000.

16. The inkset of claim 15, wherein said cationic polymer has at least one pendant ionic moiety of the formula:

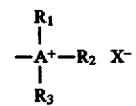

wherein A is selected from the group consisting of N, P, and S; $R_1$, $R_2$ and $R_3$ are independently selected from the group consisting of H, alkyl or alkyl ether of 1–20 carbon atoms, aryl or alkylaryl of 1–10 carbon atoms, wherein $R_3$ is not present when A is S; and wherein X is selected from the group consisting of halides, conjugate bases of organic acids, and conjugate bases of inorganic acids.

17. The inkset of claim 16, wherein the cationic polymer is an AB block polymer.

18. The inkset of claim 17, wherein the cationic AB block polymer comprises an A block prepared from homopolymers or copolymers of methyl methacrylate and butyl methacrylate and a B block prepared from homopolymers or copolymers of dimethylaminoethyl methacrylate and diethylaminoethyl methacrylate.

* * * * *